United States Patent [19]

Maass et al.

[11] 4,206,345
[45] Jun. 3, 1980

[54] ELECTRICALLY HEATABLE HOME APPLIANCE

[75] Inventors: Rudolf Maass, Solingen; Hans-Jürgen Mehnert, Solingen-Wald, both of Fed. Rep. of Germany

[73] Assignee: Robert Krups, Solingen, Fed. Rep. of Germany

[21] Appl. No.: 927,539

[22] Filed: Jul. 24, 1978

[51] Int. Cl.² ............................................. H05B 3/06
[52] U.S. Cl. ...................................... 219/524; 99/374; 99/379; 219/386; 219/447; 219/525
[58] Field of Search ................ 219/385, 386, 404, 445, 219/411, 446, 521, 447, 524, 525, 530, 430, 432, 433, 439; 99/331, 340, 372, 376, 377, 379, 425, 421 H

[56] References Cited

U.S. PATENT DOCUMENTS

| | | | |
|---|---|---|---|
| 2,719,903 | 10/1955 | Oertli | 219/525 |
| 2,765,727 | 10/1956 | Lipsich et al. | 99/331 |
| 3,146,692 | 9/1964 | Connolly et al. | 99/379 |
| 3,848,110 | 11/1974 | Giguere et al. | 219/525 |
| 3,852,569 | 12/1974 | Potvin | 219/525 |

FOREIGN PATENT DOCUMENTS 2602716  7/1977  Fed. Rep. of Germany ........... 219/524

*Primary Examiner*—Volodymyr Y. Mayewsky
*Attorney, Agent, or Firm*—Michael J. Striker

[57] ABSTRACT

An electrically heatable broiler, browner and waffle maker comprises a base part including a hot plate and a top part also including a hot plate, the two parts being interconnected by an articulated hinge joint including an extendable linking member and a plurality of stop surfaces permitting different angular positions of the top part relative to the base part.

13 Claims, 13 Drawing Figures

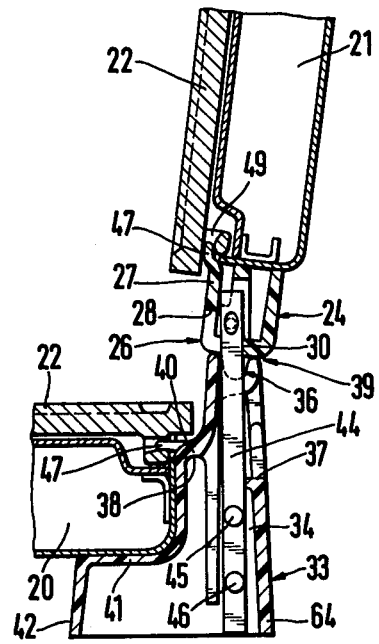
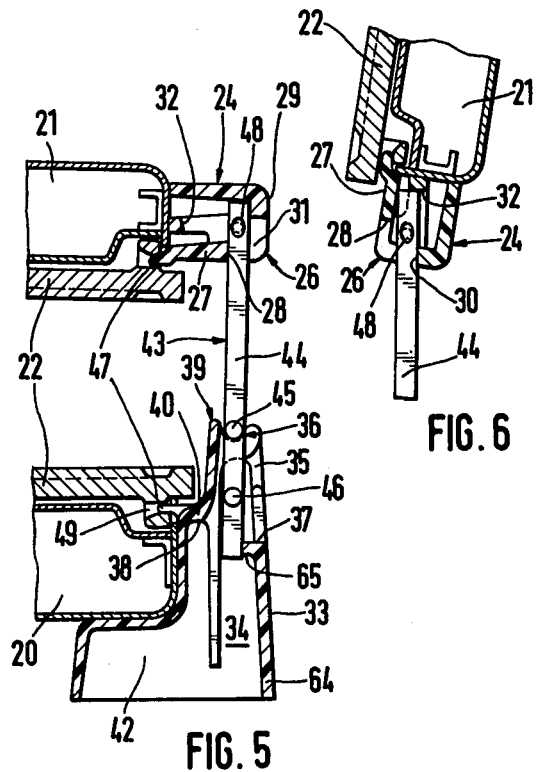

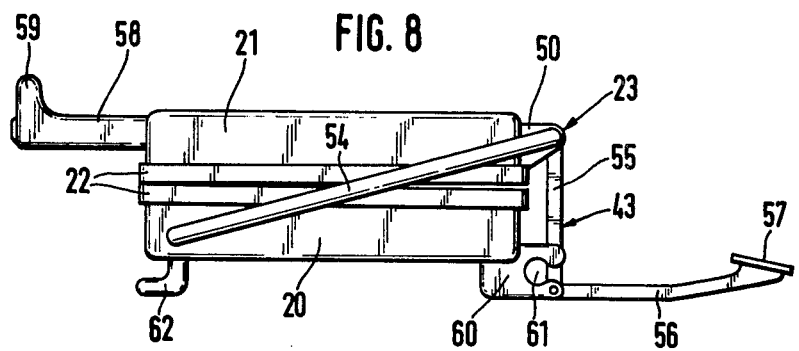
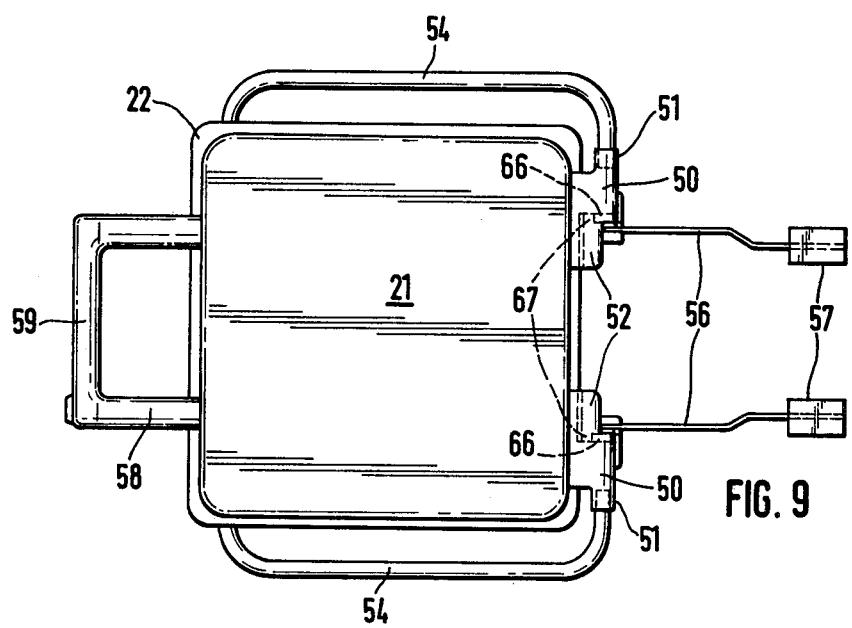
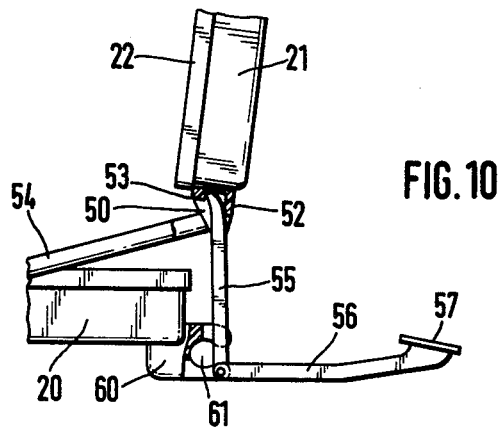

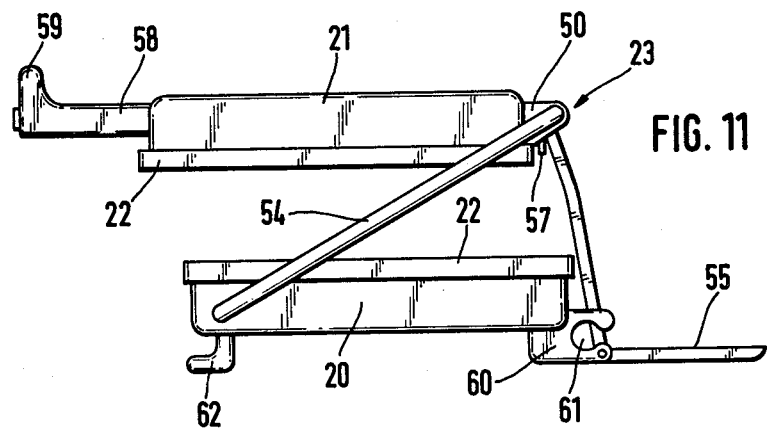
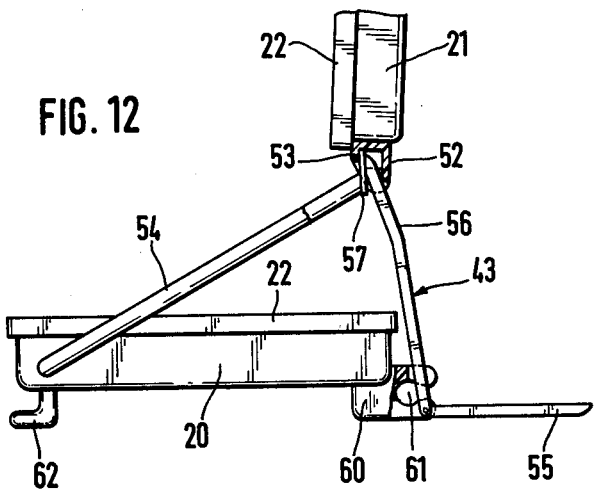
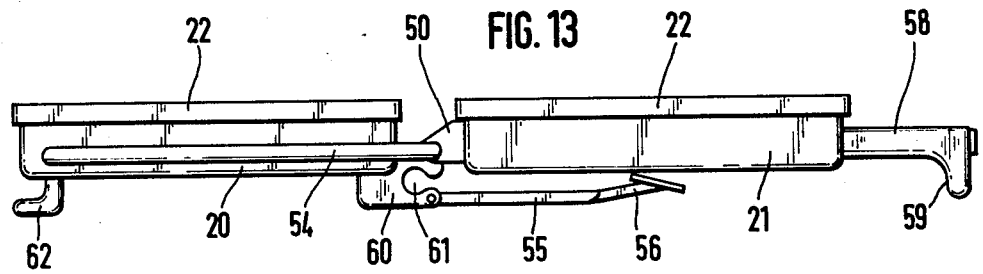

ELECTRICALLY HEATABLE HOME APPLIANCE

BACKGROUND OF THE INVENTION

The invention is concerned generally with an electrically heatable home appliance and more particularly it is concerned with an electric broiler including a base part having a hot plate and a top part having also a hot plate, the two parts being mutually connected by means of a hinge joint that is provided with stop surfaces for supporting the top part in a swung-open position.

An electrically heatable flat broiler is known from the German utility model (Gebrauchsmuster) No. 72 39 498. This broiler has a base part which is provided with a lower half of a hinge joint that includes an oblong hole extending substantially perpendicularly through the surface of the hot plate and serves as a bearing guide in which a hinge bolt mounted on the upper half of the hinge joint in the top part of the appliance, is tiltably and shiftably supported. When the top part of the flat broiling device is swung open into an approximately perpendicular position, it can be fixed in this position by means of selectively surmountable stop surfaces provided on both halves of the hinge joint. Due to the fact that this known broiler, apart from its swung-open perpendicular position, can resume only one closed position adjusted to the thickness of the broiled product and a third position swung open about 180°, it can be used exclusively for broiling meat. The devices of this type have been built in many modifications and are used either for broiling meat or for browning or warming meals or for preparing wafers. They have, however, the disadvantage that the applicability of respective appliances, such as for example, broilers, is limited to the particular use for which the appliance has been designed and is not suitable for other uses such as, for instance, browning or waffle making, whereas with a waffle maker no meat products can be broiled or browned.

SUMMARY OF THE INVENTION

It is, therefore, a general object of the present invention to overcome the aforementioned disadvantages.

More particularly, it is an object of the invention to provide an improved electrically heatable home appliance of the above-described type which due to an increased number of fixed positions of the top part relative to the base part can be used selectively for broiling meats or for browning of meals or for preparing waffles or the like.

In keeping with these objects, and others which will become apparent hereafter, one feature of the invention resides, in an electrically heatable home appliance having a base part hinged to a top part, in a combination which comprises a supporting member that adjustably couples the hinge joint portion on the base part to the hinge joint portion on the top part of the appliance and that cooperates with a plurality of stop surfaces defining various positions of the top part relative to the base part. In the preferred embodiment of the invention the supporting member is in the form of a linking plate, the upper end of which is swingably hinged to the upper hinge joint portion mounted on the top part of the appliance whereas the lower end portion of the link plate is provided with two successively arranged pairs of pivots or pins that are slidably accommodated in a guiding groove extending substantially perpendicularly from the hinge joint portion mounted on the base part of the appliance. The guiding groove in its upper range is provided with recesses for releasing the upper pair of pins and above these recesses open bearing cups are arranged for supporting the free upper pair of pins. In addition to the limited opening of the upper part of the appliance it is also possible to arrange the two appliance parts parallel to each other and at such a spacing as required by the thickness of the product being grilled. The spacing between the hot plates of the two parts can be increased until the upper pair of pins in the guiding grooves abut against the bottom of the bearing cups. The pins in the upper pair are shorter than the pins in the lower pair so that the lower pins are prevented effectively from being released through the recesses in the guiding grooves. By releasing the shorter upper pins from the recesses and by tilting the linking plate about the lower pair of pins, it is possible to open the top part of the appliance relative to the base part about 180°. In addition, upon pulling of the upper pair of pins through the recesses in the guiding groove the upper pins can be inserted into the bearing cups located above the guiding grooves so that the upper end portion of the linking plate that swingably supports the top part of the appliance considerably projects above the base hot plate so that the top hot plate is spaced apart at a certain distance from the base hot plate and extends parallel to or is slightly inclined upwardly relative to the latter.

In order that the linking plate might be held in a definite horizontal position when the top part of the appliance is open about 180°, and that it might rest on the hinge joint portion that is mounted on the top appliance part, there are provided, according to another feature of this invention, stop surfaces arranged in the central range of the guiding grooves in the lower hinge joint, the stop surfaces surrounding from both sides the linking plate and extending between the two guiding grooves. The outer stop surface is arranged lower relative to the inner stop surface about the thickness of the linking plate.

A stable rest position of the top part of the appliance when swung open about 90° is attained by inclining the top part slightly to the rear from the vertical position so that the point of gravity is located behind the hinge joint. The rear surface of the upper hinge joint portion abuts against the end surface of the upper hinge joint portion that is secured to the top part of the appliance. In order to maintain the stable condition of the top part in its open position, the hinge joint portion secured to the base part of the appliance has, according to another feature of this invention, inclined end surfaces projecting outwardly from the base part and arranged on the upper end of the lower hinge joint at the bearing cups.

In order to fix the position of the top part of the appliance when the linking plate is extended perpendicularly from the lower hinge joint portion and also when the top part is spaced from the base part and extends parallel thereto and also when the top part is swung open approximately perpendicularly to the base part the upper hinge joint portion secured to the top part of the appliance is provided, according to still another feature of this invention, with a U-shaped angular member arranged between the rectangular side walls of the upper hinge joint and having its open part directed against the top part of the appliance. The outer corner of this U-shaped angular member facing the lower hinge joint part is provided with a stop surface forming a recess adapted for receiving the upper end of the linking plate whereby the stop surface in the shank and the stop surfaces in the bridge part of the U-shaped member in the upper hinge joint portion, are equally spaced from the hinge joint of the linking plate and the upper hinge joint portion.

To insure the open position of the top part when the linking plate is extended from the lower hinge joint portion, the upper part of the appliance also in this case is slightly inclined rearwardly from its vertical position and is held in this inclined position by means of a supporting surface arranged in accordance with another feature of this invention in the upper hinge joint portion opposite to the pivotable joint and arranged in the range of the open part of the U-shaped angular piece and inclined toward the upper part of the appliance, the supporting surface extending at an angle of 90° to the correspondingly inclined supporting surface of the bridging part on the upper hinge joint portion.

Since hot plates having different upper surfaces are used for broiling, browning or for baking waffles, the hot plate on the lower part as well as on the upper part of the appliance are exchangeably mounted. For this purpose the shank of the upper hinge joint portion arranged adjacent the hot plate of the top part of the appliance and the inner stop surface forming a wall part of the lower hinge joint portion are provided, respectively, with holding fingers that are engageable in openings provided in the rim both of the upper hot plate and of the base hot plate.

In a further embodiment of the invention, the two hinge joint portions mounted on the top part of the appliance are provided with outwardly diverging sleeves that serve for receiving tubular yokes that are connected to the base part and overlap diagonally the sides both of the base part and the top part whereby two supporting levers that are hinged on the rear legs of the appliance and adapted for engaging juxtaposed angular attachments at the hinge joint portions, form a support for the two upper hinge joint parts. The length of the two supporting levers is selected so that the side of the top part supporting the hinge joint portion is slightly raised from the base part of the appliance so that upon swung opening the upper part into an open position the edges of hot plates that are provided for example with teflon coating do not rub against each other so that any damage of the coating is prevented.

In the aforementioned embodiments of this invention, the possibility of browning food, e.g. a meal by establishing a spaced relationship between a raised top part extending approximately parallel to the base part and the possibility to proceed from this parallel position of the upper part into a swung-open position is attained so that apart from the aforementioned two supporting levers there are provided two additional supporting levers overhanging the former and being at one end pivotably connected to the rear legs of the base part and on the other end thereof being adapted for abutment against angular attachments at the hinge joint portions.

In order to adjust the top part in an open position swung about 180° relative to the base part, all supporting levers are first tilted into a horizontal position whereby according to another feature of this invention the free ends of the long supporting levers are bent and provided respectively with supporting plates so that damage-free support of both hot plates and the lifting of the upper part into a levelled position of the hot plate, is ensured.

According to still another feature of this invention the handle provided on the top part of the appliance has a projecting curved portion so that the top part can be supported by this curved portion when in position open about 180°.

Another feature of this invention is in the provision of outwardly directed recesses in the rear legs of the appliance, the recesses forming, together with front angular legs, a winding lane for the connection cable.

In addition to the previously mentioned advantages, a further advantage of the embodiments according to this invention resides in the fact that in vertical position of the top part the top hot plate overlaps partially the lower hot plate so that grease or oil that might drip from the top hot plate lands always on the lower hot plate and not on the mounting support. Another advantage is to be seen in the fact that tilting forces occurring in individual open positions of the top part are transferred into the base part not by the hinged joint but only by the corresponding stop surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a sectional side view of the hinge joint of FIG. 2 shown in a position swung open slightly above 90°;

FIG. 5 is a sectional side view of the hinge joint of the applicance of FIG. 2 shown in its raised position with parallel directed base and top parts;

FIG. 6 is a cut-away side view of the upper hinge joint portion of the applicance of FIG. 2, shown in an extended position and swung open about 90°;

FIG. 7 is a sectional side view of the hinge joint of FIG. 2 shown in its extended position and swung open about 180°;

FIG. 8 is a side view of another embodiment of an electrically heatable home appliance of this invention shown in its closed position;

FIG. 9 is a top view of the appliance of FIG. 8;

FIG. 10 is a cut away side view, partly in section of the appliance in FIG. 8 shown in a position swung open about slightly above 90°;

FIG. 11 shows in a side view the appliance of FIG. 8 in the raised position of its top part;

FIG. 12 shows in a side view the appliance of FIG. 8 having its upper part raised and swung open slightly above 90°; and FIG. 13 is the appliance of FIG. 8 shown in a position swung open about 180°.

DESCRIPTION OF THE PREFERRED EMBODIMENTS

Figure 1:
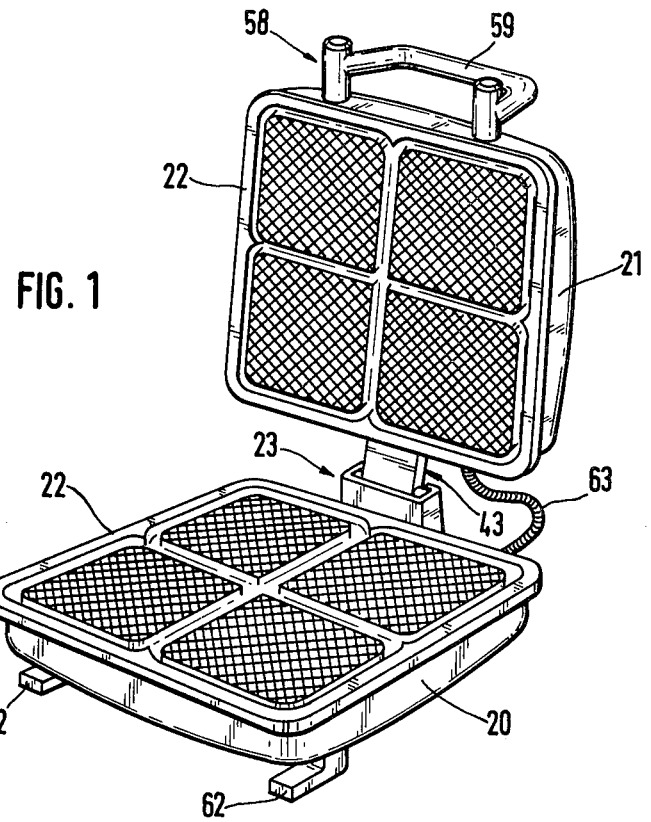
FIG. 1 is a perspective view of the appliance of this invention shown in positions swung open about 90°.
Figure 2:
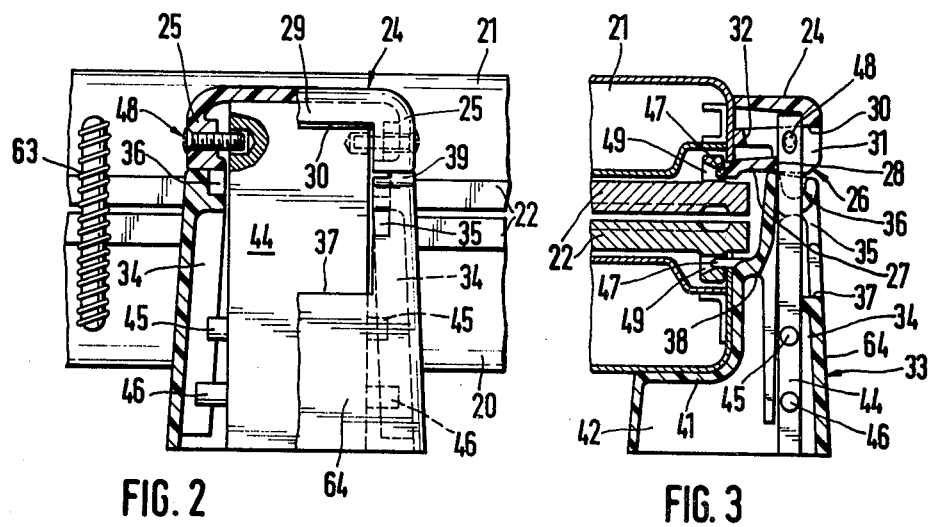
FIG. 2 is a rear view, partly in section of the hinge joint of the appliance of FIG. 1 shown in its closed position.

The electrically heatable home appliance in the embodiment according to FIG. 1 comprises a stationary base part and a tiltable and vertically adjustable top part 21, each of the parts 20 and 21 being provided with a hot plate 22. To swing open the top part 21 relative to the base part 20 the rear sides of the two parts are coupled by means of a hinge joint 23. The hinge joint portion 24 or 50 connected to the top part 21 is coupled to at least one supporting member 43 swingably joined to the base part 20 in such a manner as to insure different vertical and angular displacements of the top part 21 relative to the base part 20.

Figure 3:
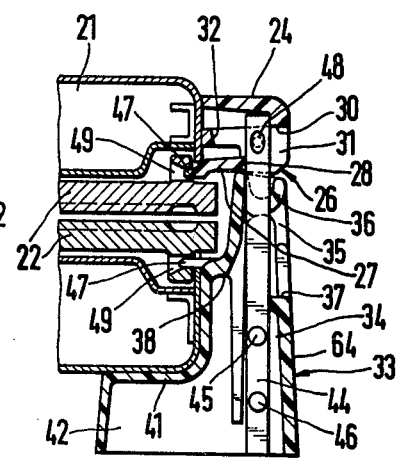
FIG. 3 is a sectional side view of the hinge joint of FIG. 2.

As illustrated in detail in FIGS. 2-7, a portion 24 of the hinge joint 23 is connected to the top part 21 by screws for example; the upper hinge joint portion 24 is slidably coupled to the lower hinge joint portion 33 of the base part 20 by means of a linking plate 44 acting as the aforementioned supporting member. To swing open the top part 21, the linking plate 44 is connected at its upper end by means of a pivotable hinge 48 to the side wall 25 of the upper hinge joint portion 24. The pivotable hinge 48 consists of two blind holes provided in narrow sides of the linking plate 44 and two bolts connected to the side walls 25 of the upper hinge joint portion 24 and projecting into the respective holes. To provide for a certain degree of backlash or tolerance in the support of the top part 21 relative to the base part 20, so as to accommodate meat pieces the shape of which is not exactly parallel, the diameter of the blind holes is a little larger than the diameter of the bolts and morever, the breadth of the linking plate 44 is smaller than the breadth of the recess 31. The lower range of the linking plate 44 is provided with two successively arranged pairs of pins 45 and 46 projecting from opposite narrow sides of the plate; the pins in the lower pair 46 are slightly longer than the pins 45 in the upper pair. Both pin pairs 45 and 46 are slidably supported in guiding grooves 34 made in the lower hinge joint portion 33. The guiding grooves 34 have in the upper range of the lower hinge joint portion 33 rearwardly directed recesses 35 that are slightly broader than the diameter of the pins 45 and through which the pins 45 can be tilted out of the guiding grooves 34. Due to the fact that the lower pin pair 46 is longer than the upper pin pair 45, the former pair 46 cannot pass through the recesses 35 and remain in the guiding grooves 34. Immediately above the recesses 35 the lower hinge joint portion 33 has open bearing cups 36 in which the upper pin pair 45 can be inserted from above. The two guiding grooves 34 that are spaced apart from each other about the width of the linking plate 44 are connected by a wall 64 arranged on the outer side at the lower edge of the hinge joint portion 33. The wall 64 reaches only to the central part of the guiding grooves so that the upper part of the hinge joint portion 33 is open and the linking plate 44 can be swingably displaced through this open portion. The upper edge of the wall 64 forms an outer stop surface 37 for supporting the linking plates 44 in its 180° open position; the end portion of the plate 44 in this position abuts against an inner stop surface 38 provided in a bell-shaped rear wall 40 of the lower hinge joint portion 33. In this embodiment the outer stop surface 37 is lowered relative to the inner stop surface 38 about the thickness of the linking plate 44. The wall 64 reaches only to the central range of the guiding grooves so that the upper range of the lower hinge joint portion 33 is open and through this open space the linking plates 44 can be tilted outwardly. The upper edge of the wall portion 64 forms an outer stop surface 37 for supporting the linking plates in its 180° open position whereby the end portion of the plate 44 abuts against stop surface 38 provided in a bell-shaped inner wall portion 40 of the lower hinge joint portion 33. The upper end of the lower hinge joint portion 33 that supports the bearing cups 36 has a slightly rearwardly inclined end surface 39 that serves for supporting the bottom surface of the upper hinge joint portion 24 when the top part 21 is swung open vertically and assumes a slightly rearwardly inclined position. The end surface 39 on the lower hinge joint portion 33 projects above the base part 20 at such a distance that at the closed position of the top part 21 the upper hinge joint portion 24 abuts against the tip of the bell-shaped inner wall 40 and maintains the teflon coated outer surfaces of the hot plate 22 at a small distance apart from each other (FIG. 3). This arrangement prevents the edges of the hot plate from rubbing against each other when the upper part 21 is open. Consequently, no wear results from the swinging movement of the upper part. The side walls 25 of the upper hinge joint portion 24 have a U-shaped cross-section that in the range of the corner 26 between the lower part of the shank of a wall and the bridging part 29 is provided with a recess 31 corresponding to the breadth of the linking plate 44. This recess 31 produces stop surfaces 28 and 30 both on the shank 27 and the bridging portion 29. The stop surfaces 28 and 30 form together an angle slightly over 90° and are equally spaced from the pivotable joint 48. The stop surface 30 extends from the interior of the hinge joint portion 24 and is inclined relative to the outer surface of the bridging part 29. A supporting surface 32 for supporting a face edge of the linking plate 44 is arranged opposite the pivotable joint 48 in the range of the open section of the U-shaped side walls 25 of the upper hinge joint portion 24 and forms an angle of 90° relative to the inclined stop surface. The hinge joint portions 24 and 33 assist in fixing in position the exchangeable hot plate 22 preferably in such a manner that holding fingers 47 are provided on the shank 27 of the upper hinge joint portion 24 whereas similar holding fingers 47 project from bell-shaped wall 40 of the lower hinge joint portion 33. These holding fingers 47 engage openings 49 in the rim of hot plates 22 so that the latter are held in position in the area of the corresponding hinge joint. A wall part 41 of the lower hinge joint portion 33 is extended below the base part 20 of the appliance to form rear legs 42 that together with two angular legs 62 formed at the opposite side at the bottom of the base parts 20 define the installation plane of the whole appliance. Heating elements (not shown) in the hot plate of the upper part 21 and the lower part 20 are interconnected by conductive conduits that are accommodated in a flexible cable sleeve 63 connecting the two parts 20 and 21. In the position illustrated in FIGS. 2 and 3 the top part 21 extends parallel to and immediately above the base part 20. In this position the appliance is used especially for baking waffles when an applicable hot plate has been exchanged in both appliance parts. In this closed position of the parts 20 and 21 the upper hinge joint portion 21 abuts against the inner edge of the end surface 39 whereby the height of the lower hinge joint portion 33 is selected so that small gap results between the two hot plates. In this closed position a major part of the linking plate 44 is retracted within the lower hinge joint portion 33. If the baking or broiling substance is to be removed or replaced, the upper part 21 is swung open to such an extent until the bridging part 29 of the upper hinge joint portion 24 abuts on the end surface 39 of the lower hinge portion 33 and stays in this stable supporting condition (FIG. 4). If a thick piece of meat, for example, is inserted between the hot plates 22, the upper part 21 during its closing adjusts automatically both the corresponding vertical and angular positions of the upper hinge portion 24; this automatic adjustment results from the fact that the linking plate 44 is freely movable in vertical direction in the guiding grooves 34 and at the same time it is easily tiltable. FIG. 5 shows the home appliance of this invention in its browning position in which the upper part 21 and the base part 20 extend parallel to each other and are spaced for a predetermined distance from each other. This elevated position of the upper part is attained by first lifting the linking plate 44 in the guiding groove 34 so far until the upper pin pair 45 abuts against the bottom of the bearing cups 36. In this elevated position the upper pin pair 45 can be withdrawn outwardly through the recesses 35 and subsequently the pins are inserted into bearing cups 36. The linking plate 44 is thereby supported at one side thereof in the bearing cups 36 and at its bottom end it rests against a nose 65 of the outer surface 37; in this manner a slightly rearwardly inclined position of the linking plate 44 is attained. The hinge joint portion 24 connected to the upper part 21 rests on the top end surface 25 of the linking plate 44 and with its stop surface 28 bears upon the side surface of the plate 44. This support of the upper part 21 provides for an approximately parallel position of the spaced hot plates 22 (FIG. 5). For withdrawing the browned meal the upper part 21 can be swung open and remains in a substantially vertical position slightly inclined rearwardly. In this vertical position the supporting surface 32 of the upper hinge joint portion 24 rests on the tip of the linking plate 44 and the stop surface 30 bears upon the side surfaces of the plate 44 (FIG. 6). For grilling or for cleaning or exchanging the hot plates, the upper part 22 can be swung open about 180°; in doing so, the upper pair of pins 45 is displaced from the bearing cups 36 and the linking plate 44 is rotated about the lower pair of pins 46 to such an extent until the plate is held by means of its stop surfaces 37 and 38 in a horizontal position. The upper part 21 in this position is supported by the assigned hinge joint portion 24 which bears on the free end portion of the plate 44 and the arched portion 59 of its handle 58 rests on a support such as a table for example (FIG. 7).

In another exemplary embodiment of this invention, two separate hinge joint members 60 placed side-by-side are firmly connected to the upper part 21 and are provided with outwardly directed sockets 51 each adapted for supporting an end portion of a tubular yoke 54. The yokes 54 extend diagonally across corresponding sides of the appliance and the other end of each yoke is pivotably mounted in the lower part 20. The hinge joint members 60 are provided with angular attachments 52 for engaging free ends of supporting levers 55 that are pivotably mounted in the rear legs 60 of the appliance. The length of each supporting lever 65 is such that in the closed position of hot plates 22 the latter are held by the lever 55 at a slightly spaced relationship to each other. After swinging the upper part 21 in an open vertical position slightly inclined rearwardly the upper part 21 can reliably maintain this position because the angular attachments 52 are provided respectively with a projecting edge 53 which engages inwardly bent pointed ends of the supporting levers 65 (FIG. 10). In the browning position of the appliance as illustrated in FIG. 11 the relatively short supporting levers 65 are swung out of engagement with the upper part 21 and the longer supporting levers 56 that are also pivotably supported on the rear legs 60 engage with their free ends the angular attachments 52 of the hinge joint members 50. The free ends of the longer supporting levers 66 are provided with abutment plates 57 that in the position as shown in FIG. 11 rest on the projecting edges 53 and in slits 67 formed by cams 66 (FIG. 9). In this manner the upper part 21 is held in a stable horizontal position relative to the base part 20 and is spaced therefrom by a distance determined by the supporting levers 56. In the swung open position of the upper part 21 as shown in FIG. 12 the abutment plate 57 rests from below on the projecting edges 53 whereas the free shank of the angular attachments 52 bear upon the upper side of the supporting levers 56. By slightly lifting the upper part 21 the hinge joint members 50 together with their angular attachments 52 are disconnected from the supporting levers 56 and upon tilting the supporting levers 56 into a horizontal position the upper part 21 can be swung open about the two pivots of the tubular yoke 54 into a 180° open position whereby supporting legs 60 serve as a pedestal for the upper part 21. The projecting arched portion 69 of the handle 58 serves as the extended support for the upper part (FIG. 13).

The rear legs 60 are preferably provided with outwardly directed recesses 61 that together with the front angular legs 62 form a winding track for a connection cable (not shown).

It will be understood that each of the elements described above, or two or more together, may also find a useful application in other types of constructions differing from the types described above.

While the invention has been illustrated and described as embodied in specific examples of the electrically heatable home appliance, it is not intended to be limited to the details shown, since various modifications and structural changes may be made without departing in any way from the spirit of the present invention. For example the hinge joint parts 24, 33 and 50 can be made of a synthetic material or of a steel sheet or of other metal. Also, the shape of the hinge joint parts 24, 33 and 50 can be adjusted to accommodate a linking plate 44 consisting of two parts. Also, the hollow space in rear legs 42 can be used for accommodating electrical connectors.

What is claimed as new and desired to be protected by Letters Patent is set forth in the appended claims:

1. In an electrically heatable home appliance including a stationary base part and a movable top part, each of the parts being provided with a hot plate and with a hinge joint portion, a combination comprising an extendable supporting member adapted for coupling and guiding said hinge joint portions of said parts; and abutment surfaces provided on said hinge joint portions and said supporting member for holding said parts in predetermined vertical and angular positions.

2. The combination as defined in claim 1, wherein said supporting member includes an extendable linking plate the upper end of which is pivotably coupled to the hinge joint portion connected to said top part, the lower end portion of said linking plate being provided with two pairs of laterally projecting pins, the hinge joint portion connected to said base part having two guiding grooves for guiding said projecting pins, said guiding grooves having at their upper range recesses for passing through the upper pair of said pins and being terminated with bearing cups for supporting said upper pins when said linking plate and thereby said upper part are in an elevated position.

3. The combination as defined in claim 2, wherein a first pair of abutment surfaces is provided approximately in the middle range of said guiding grooves for supporting the lower end of said linking plate when the latter is swung open about 180°.

4. The combination as defined in claim 3, wherein the top edges of said bearing cups are arranged in a slightly rearwardly inclined plane and form an abutment surface for said upper hinge joint portion when said upper part is swung open slightly above 90°.

5. The device as defined in claim 4, wherein said lower hinge joint portion extends below a bottom portion of said base part and forms rear supporting legs for said base part.

6. The combination as defined in claim 4, wherein said upper hinge joint portion has a U-shaped cross-section defining two shanks directed towards said upper part and a bridging portion, the corner area between the lower shank and said bridging portion being provided with a recess for passing through the upper end of said linking plate, said recess forming an abutment surface in said shank and another abutment surface in said bridging part, said abutment surfaces in said corner recess forming substantially a right angle and being equally spaced from the pivotable joint of said linking plate.

7. The combination as defined in claim 6, wherein an abutment nose is provided in the central area of the outer wall of said lower hinge portion for supporting the end portion of said linking plate when the latter is extended to a raised position in which the upper pair of said pins rests in said bearing cups and the upper end of said linking plate bears upon said abutment surface in said corner recess, thus holding said upper part in a spaced parallel position relative to said base part.

8. The combination as defined in claim 6, wherein said upper hinge joint portion includes an additional abutment surface arranged opposite said pivotable joint of said linking plate for supporting a surface of said linking plate when said top part is swung open slightly above 90° and rests with its side surface against the abutment surface in said corner recess.

9. The combination as defined in claim 1, wherein said upper hinge portion and said lower hinge portion are provided respectively with holding fingers for disconnectably engaging corresponding recesses provided in respective hot plates.

10. The combination as defined in claim 9, wherein the plane of the top surface of the upper hot plate in the 90° swung open position of said upper part intersects the top surface of said stationary hot plate.

11. The combination as defined in claim 1, wherein said top part is provided with a handle having an arched portion adapted for supporting said top part when the latter is swung open about 180°.

12. The combination as defined in claim 1, wherein the rear supporting legs of said base part include recesses that in cooperation with angular supporting legs form a winding track for a connection cable.

13. The combination as defined in claim 5, further including electrical connectors arranged in the empty space of the part of the lower hinge joint portion forming the rear supporting legs.

* * * * *